(12) United States Patent
Wada

(10) Patent No.: US 7,600,792 B2
(45) Date of Patent: Oct. 13, 2009

(54) FLARE-SHAPED END STRUCTURE FOR TUBE

(75) Inventor: Shizuo Wada, Koga (JP)

(73) Assignee: Sanoh Kogyo Kabushiki Kaisha, Koga-Shi (JP)

( * ) Notice: Subject to any disclaimer, the term of this patent is extended or adjusted under 35 U.S.C. 154(b) by 112 days.

(21) Appl. No.: 10/575,191

(22) PCT Filed: Jan. 25, 2005

(86) PCT No.: PCT/JP2005/000885

§ 371 (c)(1), (2), (4) Date: Apr. 7, 2006

(87) PCT Pub. No.: WO2005/073608

PCT Pub. Date: Aug. 11, 2005

(65) Prior Publication Data

US 2007/0052236 A1 Mar. 8, 2007

(30) Foreign Application Priority Data

Jan. 28, 2004 (JP) .............................. 2004-019812

(51) Int. Cl.
*F16L 25/00* (2006.01)
(52) U.S. Cl. .................. 285/334.5; 285/246; 285/386
(58) Field of Classification Search ................ 285/246, 285/334.5, 386; 138/109, 155
See application file for complete search history.

(56) References Cited

U.S. PATENT DOCUMENTS

| | | | | |
|---|---|---|---|---|
| 1,804,814 A | * | 5/1931 | Schultis ................ 285/334.5 |
| 2,458,817 A | * | 1/1949 | Wolfram ................ 285/328 |
| 2,545,168 A | * | 3/1951 | Richardson ............. 285/334.4 |
| 4,842,310 A | * | 6/1989 | Muffke et al. ........... 285/334.5 |
| 5,283,951 A | * | 2/1994 | Davenport et al. ...... 29/890.144 |
| 5,489,127 A | * | 2/1996 | Anglin et al. ............. 285/328 |
| 5,529,349 A | * | 6/1996 | Gibbs et al. ............. 285/332 |
| 6,357,801 B1 | * | 3/2002 | Takahashi et al. ........ 285/334.5 |
| 6,663,146 B1 | * | 12/2003 | Sakai et al. .............. 285/353 |

FOREIGN PATENT DOCUMENTS

| EP | 0 997 677 | 5/2000 |
|---|---|---|
| EP | 1 236 946 | 9/2002 |
| JP | 2001-141141 A | 5/2001 |
| JP | 2002-286177 A | 10/2002 |

OTHER PUBLICATIONS

Patent Abstract of Japan of JP 2002-286177 A Dated Oct. 3, 2002.
Patent Abstract of Japan of JP 2001-141141 A Dated May 25, 2001.

* cited by examiner

*Primary Examiner*—Aaron M Dunwoody
*Assistant Examiner*—Fannie Kee
(74) *Attorney, Agent, or Firm*—Ladas and Parry LLP

(57) ABSTRACT

A flared end structure formed by processing an end part of a metal tube which is pressed against a seat formed in a member by tightening a coupling nut to the member. The flared end structure has a joining end part to be pressed against the seat of the member, and a curved part continuous with the joining end part. The curved part has an outer surface having a curved area, and a concave inner surface having a bottom edge. The curved area of the outer surface has a radius of curvature smaller than the wall thickness of the metal tube.

2 Claims, 4 Drawing Sheets

PRIOR ART

FLARE-SHAPED END STRUCTURE FOR TUBE

BACKGROUND OF THE INVENTION

1. Field of the Invention

The present invention relates to a flared end structure of a tube for forming a flared type pipe joint to be used in an automotive brake system or the like.

2. Description of the Related Art

A flared type pipe joint having a flared end structure of a tube is used widely for connecting tubes of a hydraulic circuit. Referring to FIG. 5 showing a prior art flared type pipe joint disclosed in JP-A 11-315976, a tube 10 is coupled to a nipple 11. The tube 10 has a flared end structure 12 formed by conically expanding one end part of the tube 10. The nipple 11 has an open end. A seat 13 is formed in the inner circumference of the open end of the nipple 11. The flared end structure 12 is pressed against the seat 13. A sleeve 14 is slidably put on the tube 10. The sleeve 14 has a pressing end pressed against the flared end structure 12. A coupling nut 15 is put on the sleeve 14. The nipple 11 has an externally threaded end provided with an external thread 16. The coupling nut 15 is screwed on the externally threaded end of the nipple 11 to press the pressing part of the sleeve 14 against the flared end structure 12 of the tube 10 to press the flared end structure 12 tight to the seat 13 of the nipple 12.

The flared end structure 12 of the tube 10 coupled to the nipple 11 by the prior art flared type pipe joint is expanded such that the expanded flared end structure 12 is capable of being elastically deformed so as to come into close contact with the seat 13. Specifications of flared end structures are specified in ISO standards.

The flared end structure 12 of the prior art flared type pipe joint is elastically deformed to make the flared end structure 12 come into close contact with the seat 13 by its resilience. Therefore, if the coupling nut 15 is screwed excessively on the externally threaded end of the nipple 11, the area of contact between the flared end structure 12 and the seat 13 increases and, consequently, contact pressured decreases and the sealing effect of the flared type pipe joint decreases. Thus, the sealing ability of the prior art flared type pipe joint is dependent on the degree of tightening the coupling nut 15 and the sealing effect of the prior art flared type pipe joint is insufficient for high-pressure piping.

SUMMARY OF THE INVENTION

Accordingly, it is an object of the present invention to provide a flared end structure of a tube capable of solving the foregoing problems in the prior art, of providing a high sealing effect without being elastically deformed and of being easily formed.

A flared end structure of a metal tube in a first aspect of the present invention to be pressed against a seat formed in a member by fastening a coupling nut to the member has a joining end part to be pressed against the seat of the member, and a curved part continuous with the joining end part; wherein the curved part has a curved outer surface and a concave inner surface having a bottom edge, and the curved area of the outer surface has a radius R of curvature smaller than the wall thickness t of the metal tube.

A flared end structure of a metal tube in a second aspect of the present invention to be pressed against a seat formed in a member by fastening a coupling nut to the member has a joining end part to be pressed against the seat of the member, and a curved part continuous with the joining end part; wherein the curved part has an curved outer surface and a concave inner surface having a bottom edge, and the curved area of the outer surface has a center of curvature at a position on the radially outer side of the bottom edge of the concave inner surface.

In the flared end structure of a metal tube according to the present invention, it is preferable that the curved outer surface merges into a flat surface, on which the coupling nut exert pressure, of a neck part, and the bottom edge of the concave inner surface is in a radial range corresponding to the flat surface of the neck part.

In the flared end structure of a metal tube according to the present invention, it is preferable that the flat surface of the neck part is perpendicular to the axis of the tube.

In the flared end structure of a metal tube according to the present invention, it is preferable that the flat surface of the neck part is connected to the outer surface of the metal tube by a curved connecting surface having a center of curvature at a position radially outside the metal tube, and the flat surface extends between the curved surface of the curved part and the curved connecting surface.

In the flared end structure of a metal tube according to the present invention, it is preferable that the radius R of curvature and the wall thickness t of the metal tube meet an inequality: $0.8t < R < t$.

A flared end structure of a metal tube in a third aspect of the present invention to be pressed against a seat formed in a member by fastening a coupling nut to the member has a joining end part to be pressed against the seat of the member, and a curved part continuous with the joining end part; wherein the curved part has an curved outer surface and a concave inner surface having a bottom edge, and the curved outer surface merges into a flat surface of a neck part to which the coupling nut applies pressure, the flat surface of the neck part is connected to the outer surface of the metal tube by a curved connecting surface having a circular cross section having a center of curvature at a position outside the metal tube, and the distance including a tolerance between the flat surface of the neck part and the end of the joining end part meets an inequality:

$$L1 < L < L2$$

where $L1 = \{(D1-D3)/2+r\}/\tan(\alpha/2) + t/\sin(\alpha/2) + t$ $L2 = \{(D2-D3)/2-t\}/\tan(\alpha/2) + t/\sin(\alpha/2) + t$ D1: Outside diameter of the metal tube D2: Outside diameter of the flared end structure D3: Inside diameter of the end of the flared end structure r: Radius of curvature of the curved connecting surface α: Cone angle of a cone containing the joining end part t: Wall thickness of the tube In the flared end structure of a metal tube according to the present invention, it is preferable that the flat surface of the neck part extends between the curved outer surface and the curved connecting surface.

In the flared end structure of a metal tube according to the present invention, it is preferable that the tube has an outside diameter not smaller than 6 mm.

The flared end structure of the present invention has high rigidity, the flared-type pipe joint including the flared end structure of the present invention is capable of closely joining the flared end structure to a member without elastically deforming the flared end structure, the flared end structure can be easily formed.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
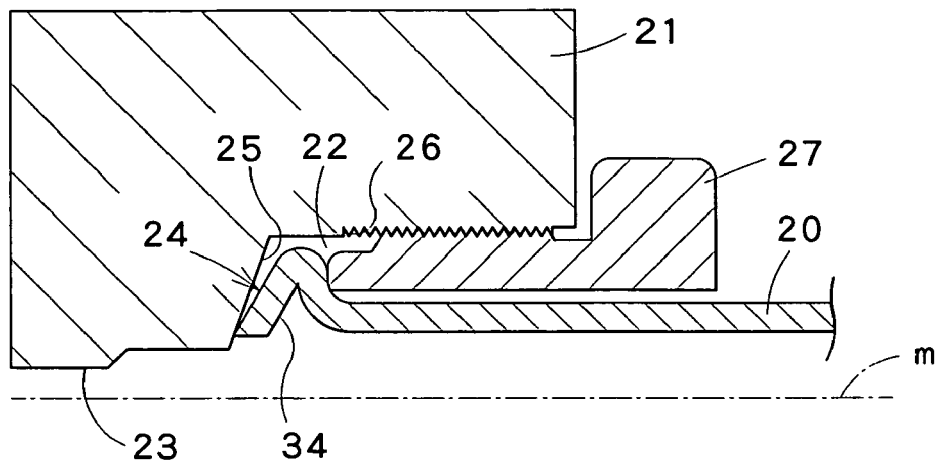
FIG. 1 is a longitudinal half sectional view of a flared end structure of a tube in a first embodiment according to the present invention.

FIG. 1 is a longitudinal half sectional view of a flared type pipe joint for connecting a tube having a flared end structure in a first embodiment according to the present invention to a port of a hydraulic cylinder. In FIG. 1, indicated at 20 is a metal tube provided with a flared end structure 24 in the first embodiment and at 21 is the body of the hydraulic cylinder. The body 21 is provided with an inlet port 22 connected to an oil passage 23. A tapered seat 25 is formed at the bottom of the inlet port 22. A coupling nut provided with an external thread is slidably put on the tube 20. The inlet port 22 is provided with an internal thread 26. The coupling nut 27 is screwed in the inlet port 22. The coupling nut 27 is tightened to press the flared end structure 24 of the tube 20 against the seat 25 of the body 21. The flared end structure 24 is formed by expanding an end part of the tube 20 in a substantially conical shape. The flared end structure 24 has dimensions and features different from those of other flared end structures including those conforming to ISO standards.

Figure 2:
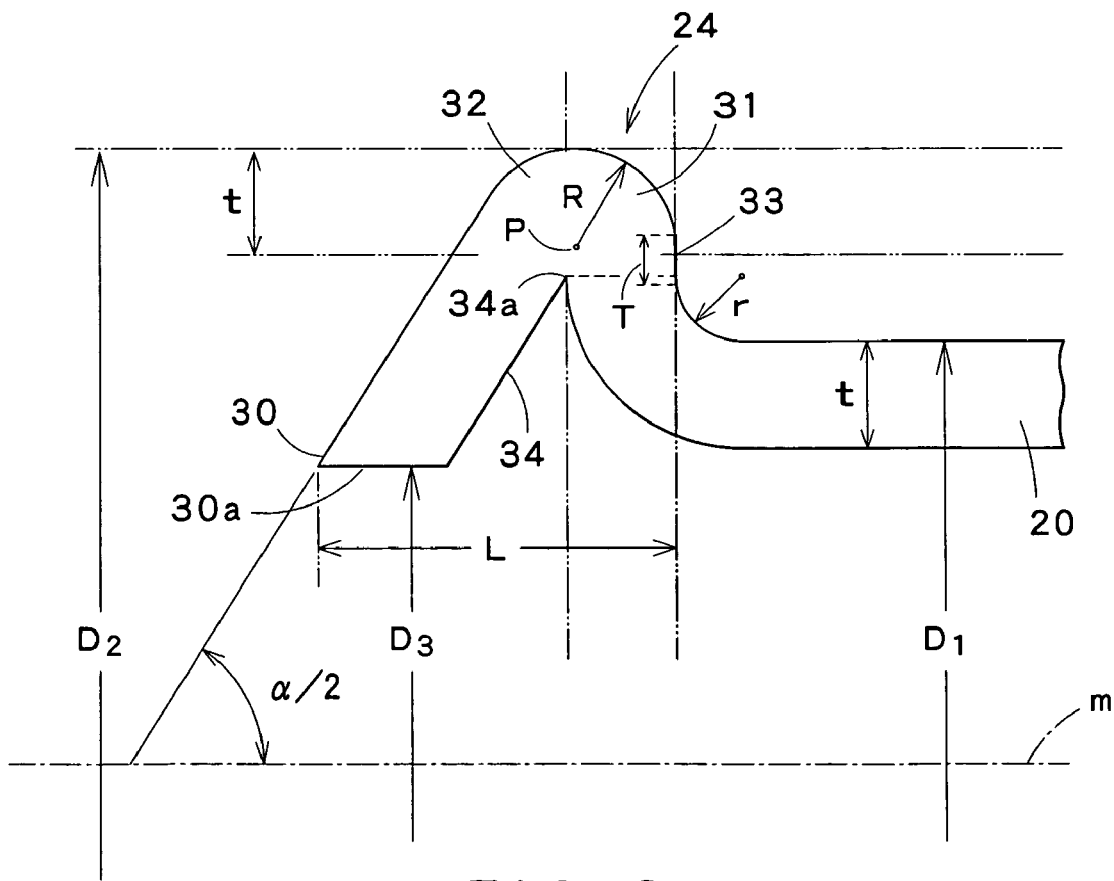
FIG. 2 is a diagrammatic view of assistance in explaining the flared end structure shown in FIG. 1.

Referring to FIG. 2 showing the flared end structure 24 in an enlarged diagrammatic view, the flared end structure 24 has a joining end part 30 to be pressed against the seat 25 of the body 21 of the hydraulic cylinder, and a curved part 32 continuous with the joining end part 30. The curved part 32 has an outer surface 31 and a concave inner surface 34 having a bottom edge 34a. The outer surface 31 has a flat area continuous with the joining end part 30 and a curved area continuous with the flat area. The curved area of the outer surface 31 of the curved part 32 of the flared end structure 24 has a radius R of curvature smaller than the wall thickness t of the tube 20. The curved area of the outer surface 31 has a center P of curvature at a position on the radially outer side of the bottom edge 34a with respect to the axis m of the tube 20. An end surface of the coupling nut 27 comes into contact with a flat surface 33 of a neck part behind the curved part 32 as shown in FIG. 1. The flat surface 33 is perpendicular to the axis m of the tube 20. A curved connecting surface having a radius r of curvature extends from the flat surface 33 and merges into the outer surface of the tube 20. Thus the curved connecting surface having the radius r extends between the inner edge of the flat surface 33 and the outer surface of the tube 20. The center of curvature of the curved connecting surface is at a position radially outside the tube 20. The flat surface 33 is contained in a plane extending between the curved area having a radius R of curvature of the outer surface 31 and the curved connecting surface having the radius r of curvature. The flat surface 33 has a radially outer edge connecting with the curved area having a radius R of curvature of the outer surface 31 and a radially inner edge connecting with the radially outer edge of the curved connecting surface having the radius r of curvature. The flat surface 33 does not necessarily need to connect with both the curved area having a radius R of curvature of the outer surface 31 and the curved connecting surface having the radius r of curvature. However, the shape of the flared end structure 24 can be explicitly described when the flat surface 33 connects with both the curved area having a radius R of curvature of the outer surface 31 and the curved connecting surface having the radius r of curvature. The flat surface 33 of the neck part does not need to be precisely perpendicular to the axis m of the tube 20. When the flat surface 33 is substantially perpendicular to the axis m of the tube 20 the coupling nut 27 advancing axially toward the flat surface 33 is able to exert a pressure efficiently on the flat surface 33 of the neck part. As mentioned above, the radius R of curvature of the curved area of the outer surface 31 is smaller than the wall thickness t of the tube 20. Practically, the curved area having the nominal radius R of curvature of the outer surface 31 is a successive arrangement of curved areas having different radii of curvature. Thus the radius R may be considered to be the mean of the different radii of curvature, and the requirement of the present invention is satisfied when the mean of the radii of curvature is smaller than the wall thickness t.

Figure 4:
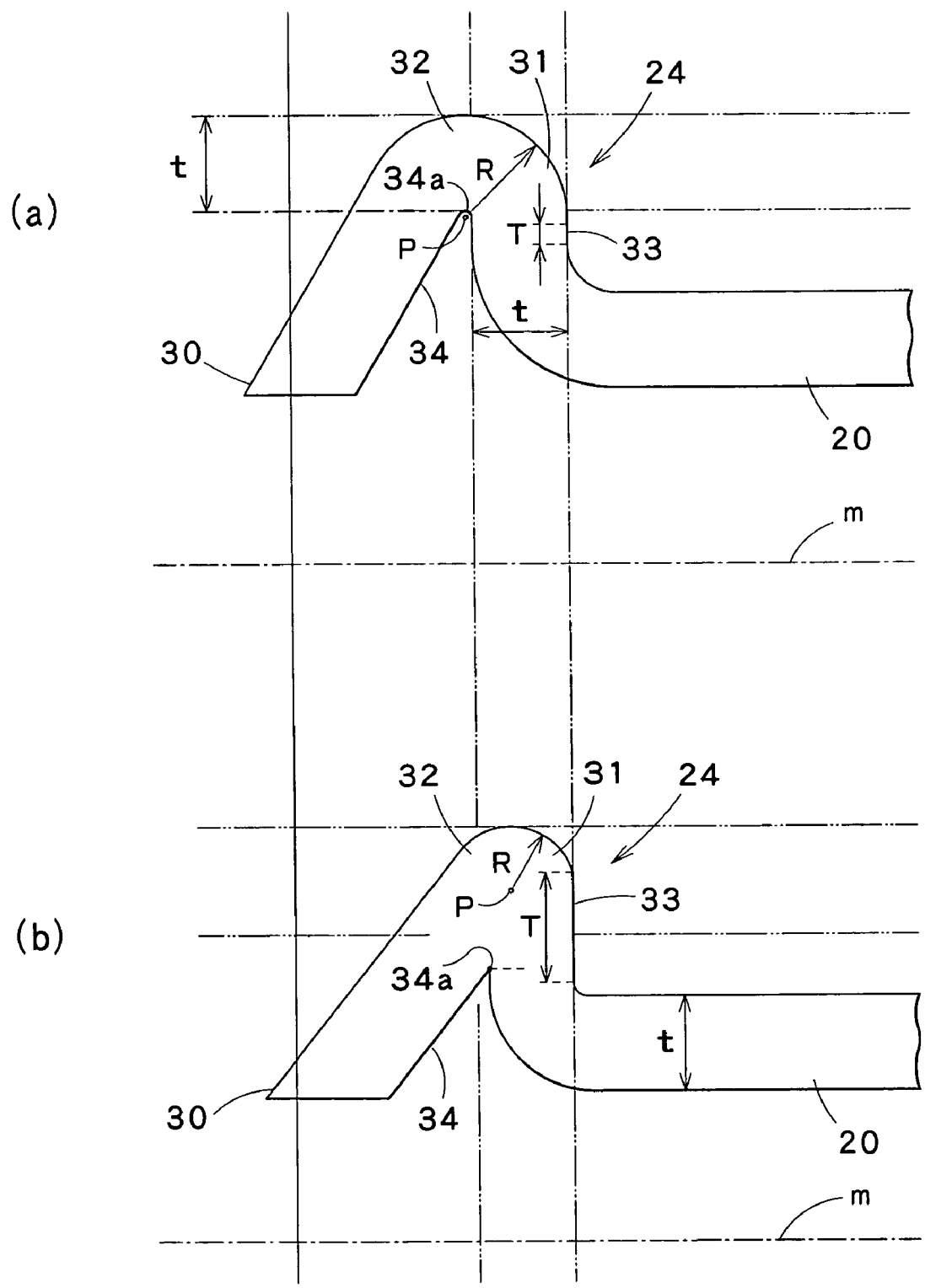
FIGS. 4(a) and 4(b) are diagrammatic views of assistance in explaining flared end structures respectively having different shapes.
Figure 5:
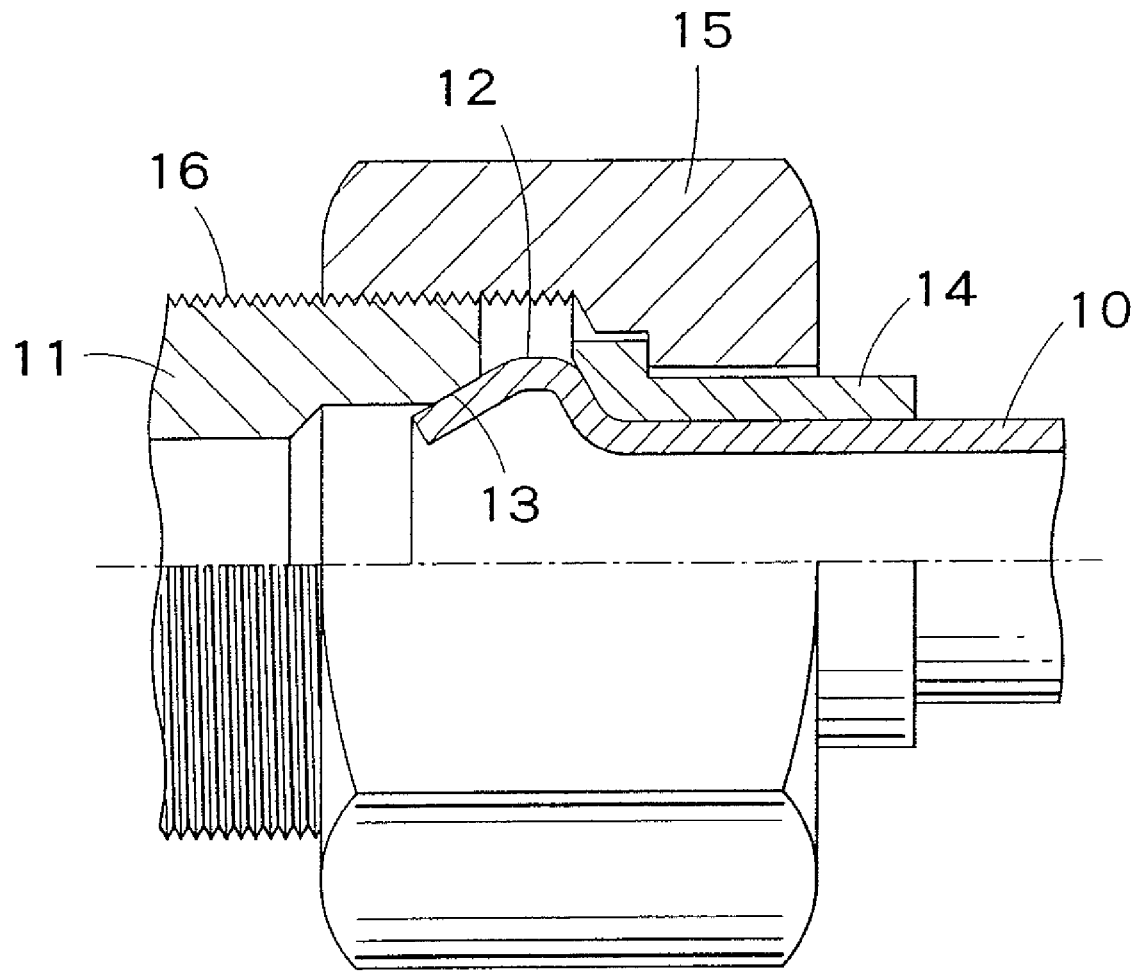
FIG. 5 is a longitudinal sectional view of a prior art flared type pipe joint.

FIGS. 4(a) and 4(b) show flared end structures of tubes 20 in comparative examples of the flared end structure 24 shown in FIG. 2. In the flared end structure shown in FIG. 4(a), the radius R of curvature of a curved area of the outer surface 31 of a curved part 32 is greater than the wall thickness t of the tube 20. In the flared end structure shown in FIG. 4(b), the radius R of curvature of a curved area of the outer surface 31 of a curved part 32 is far smaller than the wall thickness t of the tube 20.

In the flared end structure 24 of the present invention shown in FIG. 2, the bottom edge 34a of the concave inner surface 34 is in a radial range T corresponding to the flat surface 33 of the neck part with respect to the axis m of the tube 20. The center P of curvature of the curved area of the outer surface 31 is at a position on the radially outer side of the bottom edge 34a with respect to the axis m of the tube 20.

In the flared end structure 24 in the comparative example shown in FIG. 4(a) having the curved area of the outer surface 31 of a curved part 32 having the radius R of curvature greater than the wall thickness t of the tube 20, the center P of curvature is on the radially inner side of the bottom edge 34a of the concave inner surface 34 and hence the bottom edge 34a is on the radially outer side of the inner edge of the flat surface 33 of the neck part. Therefore, the center P of curvature of the curved area of the outer surface 31 is on the radially inner side of the bottom edge 34a with respect to the axis m of tube 20. Consequently, when a coupling nut 27 is tightened, the curved part 32 is compressed elastically by pressure applied to the flat surface 33.

In the flared end structure 24 of the present invention shown in FIG. 2, the bottom edge 34a is in the range corresponding to the flat surface 33. Therefore, the curved part 32 has high rigidity and is difficult to compress elastically by tightening the coupling nut 27. Consequently, pressure applied to the flat surface 33 is exerted directly to the joining end part 30 to bring the joining end part 30 into line contact with the seat 25 by high pressure. The sealing performance of the joining end part 30 in linear contact with the seat 25 is far more effective than the compressed flared end structure 24 having the joining end part 30 in surface contact with the seat 25.

In the flared end structure 24 having the radius R of curvature far smaller than the wall thickness t shown in FIG. 4(b), the bottom edge 34a of the concave inner surface 34 is on the radially outer side of the inner edge of the flat surface 33 of the neck part. Theoretically, this curved part 32 has high rigidity and is difficult to compress. Practically, when an end part of the tube 20 is processed to form the curved part 32 in such a shape, it is possible that the curved part 32 cracks. Therefore, when the radius R of curvature is far smaller than the wall thickness t or when the center P of curvature of the curved area of the outer surface 31 is on the radially outer side of the bottom edge 34a of the concave inner surface 34 with respect to the axis m, the present invention is effective, provided that the curved part 32 will not be crushed or cracked. Desirably, the radius T of curvature is not very small as compared with the wall thickness t.

Flared end structures in test samples were made by processing steel tubes respectively having outside diameters of 76.35 mm and 8 mm. It was proved that no problem arises at all in processing the steel tubes, provided that the radius R of curvature is not smaller than 0.8 times the wall thickness t of the steel tubes. Taking errors and tolerances in dimensions into consideration, no problem will not arise at all when tubes have outside diameters not smaller than 6 mm.

Figure 3:
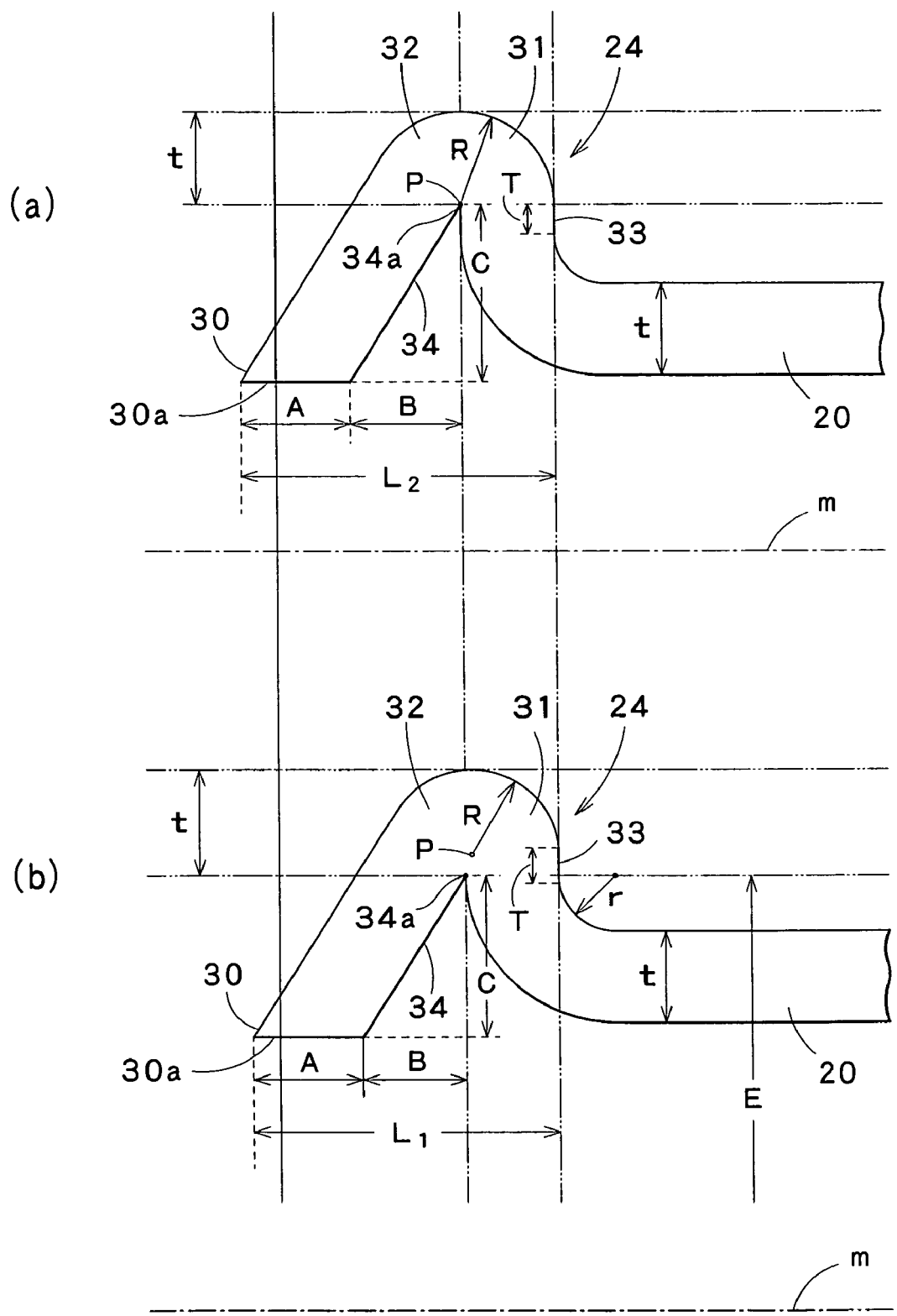
FIGS. 3(a) and 3(b) are diagrammatic views of assistance in explaining flared end structures respectively having different shapes.

FIGS. 3(a) and 3(b) are diagrammatic views of assistance in explaining the effect of the dimensional relation between the radius R of curvature and the wall thickness t, and the distance L between the flat surface 33 and the joining end part 30 on the performance of a flared end structure 24. The flared end structure 24 of the present invention is satisfactory in both rigidity and processing facility when the radius R of curvature is smaller than the wall thickness t and the distance L between the flat surface 33 and the joining end part 30 meets an inequality:

$$L1 \leq L \leq L2$$

where L1 is the distance between the flat surface 33 of a neck part and an joining end part 30 in a flared end structure 24 shown in FIG. 3(b), and L2 is the distance between the flat surface 33 of a neck part and an joining end part 30 in a flared end structure 24 shown in FIG. 3(a).

In FIG. 2, $$L1=\{(D1-D3)/2+r\}/\tan(\alpha/2)+t/\sin(\alpha/2)+t \quad (1)$$

$$L2=\{(D2-D3)/2-t\}/\tan(\alpha/2)+t/\sin(\alpha/2)+t \quad (2)$$

where
D1: Outside diameter of the metal tube
D2: Outside diameter of the flared end structure
D3: Inside diameter of the end of the flared end structure
r: Radius of curvature of the curved connecting surface
α: Cone angle of a cone containing the end of the flared end structure
t: Wall thickness of the tube.

In the flared end structure 24 shown in FIG. 3(a), R=t and the outer edge of the flat surface 33 and the bottom edge 34a are contained in the same cylindrical surface. Suppose that the width of the inner circumference 30a of the joining end part 30 is A, the axial distance between the inner end of the inner circumference 30a and the bottom edge 34a is B, the radial distance between the inner circumference 30a and the bottom edge 34a is C and the inner circumference 30a of the joining end part 30 is parallel to the axis m of the tube 20. Then, $$L2=A+B+t \quad (3)$$

Since the radial distance between the axis m of the tube 20 and the bottom edge 34a is D2/2−t, and the radial distance between the axis m of the tube 20 and the inner circumference 30a of the joining end part 30 is D3/2, the radial distance C between the inner circumference 30a and the bottom edge 34a is expressed by:

$$C=D2/2-t-D3/2=(D2-D3)/2-t$$

A=t/sin(α/2) and B=C/tan(α/2). Substituting A, B and C into Expression (3), Expression (1) is obtained.

In the flared end structure 24 shown in FIG. 3(b), R<t and the inner edge of the flat surface 33 and the bottom edge 34a are contained in the same cylindrical surface. In FIG. 3(b), $$L1=A+B+t \quad (4)$$

Since the radial distance E between the axis m of the tube 20 and the radially inner edge of the flat surface 33 is D1/2+r, where r is the radius of curvature of the curved surface continuous with the flat surface 33, $$C=E-D3/2=(D1-D3)/2+r$$

Therefore, the relation expressed by: A=t/sin(α/2) and B=C/tan(α/2) is the same as that in FIG. 3(a) and hence the distance L1 is expressed by Expression (2).

Practically, the flared end structure does not satisfy the conditions represented by Expressions (1) and (2) precisely. The dimensions of the flared end structure may vary within tolerances and may approximately satisfy the conditions represented by Expressions (1) and (2); that is, the actual dimensions of the flared end structure may differ from the nominal dimensions thereof by values not greater than permissible machining errors or by practically negligible dimensional errors.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A flared end structure of a metal tube to be pressed against a seat formed in a member by tightening a coupling nut to the member, having a joining end part to be pressed against the seat of the member, and a curved part continuous with the joining end part;

wherein the curved part has a curved outer surface with respect to the axis of the tube and a concave inner surface having a bottom edge, and the curved outer surface merges into a flat surface of a neck part, on which the coupling nut exerts pressure, the flat surface of the neck part being connected to an outer surface of the metal tube by a curved connecting surface having a center of curvature at a position radially outside the metal tube, and a distance including a tolerance between the flat surface of the neck part and the end of the joining end part of the metal tube meeting an inequality:

$L1 \leq L \leq L2$ where $L1 = \{(D1-D3)/2+r\}/\tan(\alpha/2)+t/\sin(\alpha/2)+t$ $L2 = \{(D2-D3)/2-t\}/\tan(\alpha/2)+t/\sin(\alpha/2)+t$ D1: Outside diameter of the metal tube
D2: Outside diameter of the flared end structure
D3: Inside diameter of the end of the flared end structure
r: Radius of curvature of the curved connecting surface
$\alpha$: Cone angle of a cone containing the joining end part
t: Wall thickness of the tube.

2. A flared end structure of a metal tube according to claim 1, wherein the flat surface of the neck part extends between the curved outer surface and the curved connecting surface.

* * * * *